INVENTOR
MARIO PAGANELLI
BY Michael S. Striker
ATTORNEY

3,360,691
ELECTRIC POWER RELAY WITH HIGH SENSIBILITY OF CONTROL
Mario Paganelli, Varese, Italy, assignor to Bassani S.p.A., Milan, Italy
Filed Dec. 1, 1964, Ser. No. 415,141
Claims priority, application Italy, Dec. 4, 1963, 24,883/63
10 Claims. (Cl. 317—123)

ABSTRACT OF THE DISCLOSURE

A power relay in which the armature is retained in contact with a permanent magnet while the relay is in its non-operative state. To actuate the relay and place it in its operative state, a magnetic coil surrounding the permanent magnet is energized. The magnetic field resulting from the energizing of the coil, is directed so as to oppose the field of the permanent magnet. The force attracting the armature to the permanent magnet is thereby reduced and the armature is released from contact with the permanent magnet. The armature is secured to a lever acted upon by a spring. The force exerted by the spring upon the lever is directed so that it lies substantially along the axis of the lever when the armature is in contact with the permanent magnet. When, on the other hand, the armature becomes released through the energizing of the electromagnetic coil about the permanent magnet, the spring force acting on the lever causes the armature to move away from the permanent magnet with a force which increases as the space between the armature and the permanent magnet increases.

---

This invention relates to electric relays, and is particularly but not exclusively concerned with relays suitable for use in signalling and remote control of mechanical or other devices.

Traditional electric relays are generally constituted by open electromagnets, which attract an armature, to which the member controlling the contact or contacts is attached. The armature is attracted by means of the excitation of one or more windings generating a strong magnetic field. These devices generally require an excitation of the order of several hundreds of ampere turns and normally have a considerable air gap which reduces their sensitivity.

Attempts have been made to manufacture such devices based on the opening of a biased magnetic circuit, by means of a permanent magnet, or of an electromagnet; among such devices some of them attain a sensitivity of the order of a few ampere turns. To this end, it is necessary to provide high precision mechanical operations to reduce the air gap to the minimum value. Consequently, the production cost of such devices is high, while most are adversely affected by the room conditions (e.g. dust, moisture) and also by mechanical influences such as shocks and vibrations. Their practical utility has thus been very limited.

According to the present invention, we provide an electric relay comprising a permanent magnet, an armature associated with a member controlling a relay contact, which armature is normally attracted by said permanent magnet against a spring bias, a winding placed on said permanent magnet which when excited can create a magnetic field of opposed polarity to that of said permanent magnet in order to reduce the attracting force thereof, thereby releasing the controlling member, the excitation of said winding being effected by a D.C. source via a normally non-conductive switching member, for example a transistor, which can be rendered conductive by means of a controlling signal amplified by a threshold amplifying circuit connected to the switching member.

By the use of a D.C. supply to the winding, the relay is made independent from the working conditions of the external A.C. supply system. A further advantage is that the relay requires only manufacturing operations of lesser precision than prior relays of high sensitivity, thus resulting in a reduction in production cost.

The consumption of electrical energy for each actuation of the relay is low, being of the order of about $10^{-3}$ Joule in respect of the energy on disposal in the subsidiary source, which amounts to about 250 Joule, when e.g. a Ni-Cd cell is used.

Figure 1:
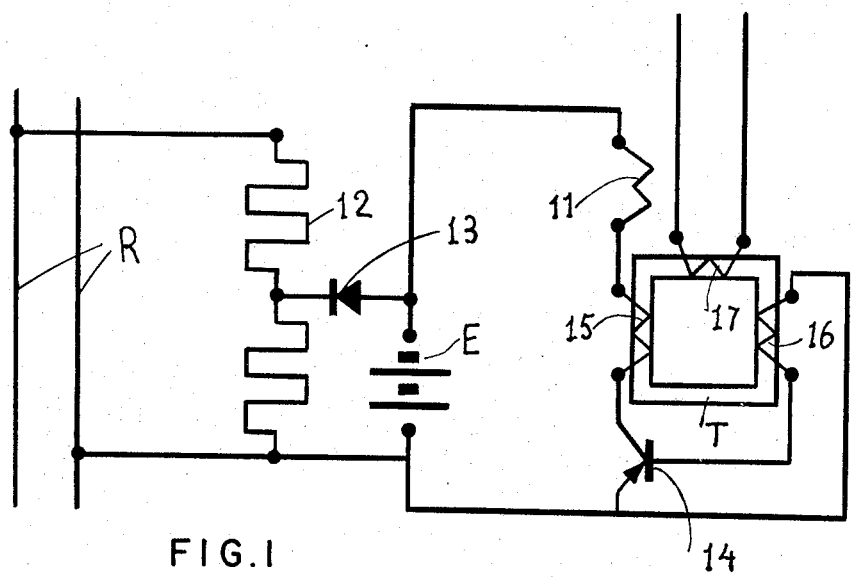

A particular but non-limitative embodiment of this invention will now be described with reference to the accompanying illustrative drawings, in which:

FIG. 1 is the electric circuit of a relay according to the invention, and

Figure 2:
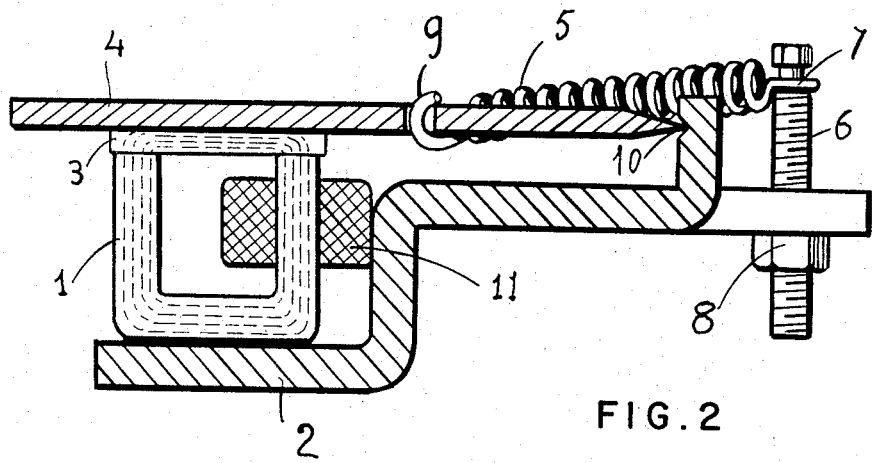

FIG. 2 the mechanical portion of the relay seen in vertical section.

Referring now to the said figures, the relay comprises a permanent magnet 1, rigidly fastened to a supporting plate 2, and the poles of which are closed by means of a movable armature 3 connected to the controlling member 4 which, in this case, is constituted by a third order lever. The power of said permanent magnet 1 is such as to maintain the armature 3 in attracted position against the bias of a return tension spring 5 connected to the lever 4. At least one of the constituent members of the magnetic circuit, for example one of the yokes, is made of oriented grain biassed material.

One end 7 of the spring 5 is anchored to the end portion of a screw 6 mounted in a threaded supporting plate 2, in such a way that the said end may be registered in relation to the fulcrum of lever 4 and fastened in a desired position by tightening a nut 8.

By such adjustment, the ends 7 and 9 of the spring 5 may be brought almost in alignment with the fulcrum 10 of lever 4, in which position (with the armature 3 closed), the force exerted by spring 5 on lever 4 has a limited vertical component, thus facilitating the attraction of the armature 3 by the permanent magnet 1 and, consequently enabling stable closure of the circuit to take place.

This relationship between spring, lever and permanent magnet firstly facilitates a high speed of movement of lever 4, inasmuch as for a small shortening of the spring 5 a large angular displacement of the lever 4 will take place; secondly, with an increase of the angular displacement of said lever, a corresponding increase of the vertical component of the force exerted by the spring is obtained. This force acts upon the lever so that a member activated by the lever 4 will be subjected to a considerably larger force than that which is overcome by the permanent magnet to attract the armature, that is to say greater than the force necessary to maintain the lever 44 in its attracted position.

To release the armature 3 from its attracted position and, consequently, to release the lever 4, there is provided on the permanent magnet 1 a winding 11, the excitation of which generates an electromagnetic field of opposed polarity to that of the permanent magnet 1, thus reducing the flux to such a value that it cannot maintain the armature 3 in its attracted position.

Excitation of winding 11 is achieved by an amplifying threshold circuit as shown in FIGURE 1, which circuit is designed to effect said excitation in response to a small signal of short duration, for example of the order of a few milliseconds, reaching said circuit.

Winding 11 is inserted in the electric circuit of a battery E, preferably a Ni-Cd cell, fed from external A.C. supply mains R through a voltage divider 12 and a rectifier, for example a germanium rectifier 13. The supply is interrupted by a switching member in the form of a transistor 14, which is normally in a non-conducting state.

An amplifier is connected to said transistor, and is constituted by a toroidal transformer having two coils 15 and 16 wound on its core, the first 15 in series connection with the winding 11, and the second 16 inserted in the transistor base circuit. A third coil 17 is wound on the transformer core, this coil 17 being connected to a signal source. In this way the arriving signal is amplified and, as soon as its amplitude exceeds the threshold of the amplifier, the transistor is quickly transferred from its non-conducting to its conducting state, thus permitting the excitation of the winding 11 by the battery E, with the consequent release of the relay.

As may be observed, the threshold amplifying circuit enables operation of the relay by weak signals, such as those emitted by controlling circuits utilizing electric microcurrents, and by signals of brief duration, for example of the order of a few milliseconds.

With the construction herein particularly described, relay sensitivities of the order of $10^{-5}$ watts can be obtained.

Also, the sensitivity of the relay is almost wholly dependent on the electronic circuit, and not on the mechanical construction, whereby disturbances due to room conditions, and to accidental mechanical influences are eliminated.

Of course, the invention can be realized in various other forms, by introducing variants and modifications which may be useful for the practical application by those skilled in the art, without departing from the ambit thereof.

I claim:

1. A power relay having operative and non-operative states comprising, in combination, supporting means; permanent magnet means secured to said supporting means; armature means attracted to said permanent magnet means and being in close proximity thereof when said relay is in said non-operative state; lever means secured to said armature means and pivotable about a pivot point on said supporting means; spring means secured to said lever means and to said supporting means and applying a force to said lever means so that the direction of said force is substantially along the axis of said lever means when said relay is in the non-operative state, said force also acting on said lever so as to move said lever in said armature away from said permanent magnet when said relay is in the operative state; and electromagnetic coil means wound about said permanent magnet means and producing when energized a magnetic field opposing the field of said permanent magnet means to reduce the attraction of said armature means to said permanent magnet means, so that said lever means is rotatable by said spring means and moves said armature means away from said permanent magnet means whereby said relay is in the operative state, said force applied to said lever means by said spring means for moving said armature means from said permanent magnet means becoming larger as the space between armature means and permanent magnet means increases.

2. The power relay as defined in claim 1 including adjusting means secured to said spring means and to said supporting means for adjusting said spring means so that the direction of the force applied to said lever means is adjustable.

3. The power relay as defined in claim 2 wherein said adjusting means is a screw device retaining at one end said spring means and being adjustably secured to said supporting means at the other end.

4. The power relay as defined in claim 3 wherein said spring means is a helically coiled tension spring retained at said one end of said screw device and in contact with said lever means so that the direction of said force is along the longitudinal axis of said helically coiled spring.

5. The power relay as defined in claim 2 wherein said lever means includes a knife edge seated in an indentation in said supporting means whereby said lever means is pivotable along a knife edge with respect to said supporting means.

6. A power relay having operative and non-operative states comprising, in combination, supporting means; permanent magnet means secured to said supporting means; armature means attracted to said permanent magnet means and being in close proximity thereof when said relay is in said non-operative state; lever means secured to said armature means and pivotable about a pivot point on said supporting means; spring means secured to said lever means and to said supporting means and applying a force to said lever means so that the direction of said force is substantially along the axis of said lever means when said relay is in the non-operative state, said force also acting on said lever so as to move said lever in said armature away from said permanent magnet when said relay is in the operative state; electromagnetic coil means wound about said permanent magnet means and producing when energized a magnetic field opposing the field of said permanent magnet means to reduce the attraction of said armature means to said permanent magnet means, so that said lever means is rotatable by said spring means and moves said armature means away from said permanent magnet means whereby said relay is in the operative state, said force applied to said lever means by said spring means for moving said armature means from said permanent magnet means becoming larger as the space between armature means and permanent magnet means increases; and amplifying means connected to said electromagnetic coil means for energizing the same when a controlling signal is applied to said amplifying means.

7. The power relay as defined in claim 6 wherein said amplifying means comprises transformer means having primary, secondary, and control windings, said control signal being applied to said control winding; a transistor with its emitter-collector path connected in series with said primary winding and said electromagnetic coil means, the base of said transistor being connected to said secondary winding; and a source of direct current connected in parallel with the series combination of said electromagnetic coil means, primary windings and emitter collector path, so that when a controlling signal is applied to said control winding, said transistor becomes conductive thereby energizing said electromagnetic coil means.

8. The power relay as defined in claim 7 wherein said source of direct current comprises variable resistor means connected across a source of alternating current; and rectifier means connected to said variable resistor means for converting the voltage derived from said source of alternating current into corresponding direct current, the magnitude of said direct current being adjustable by said variable resistor means.

9. The power relay as defined in claim 8 including battery means connected to said rectifier means.

10. The power relay as defined in claim 9 wherein said battery means is a chargeable nickel-cadmium cell.

References Cited

UNITED STATES PATENTS 3,161,806   12/1964   Gordon _____ 335—230 X
3,213,332   10/1965   Warman et al. ____ 317—155.5

LEE T. HIX, *Primary Examiner.*